United States Patent Office 2,765,183
Patented Oct. 2, 1956

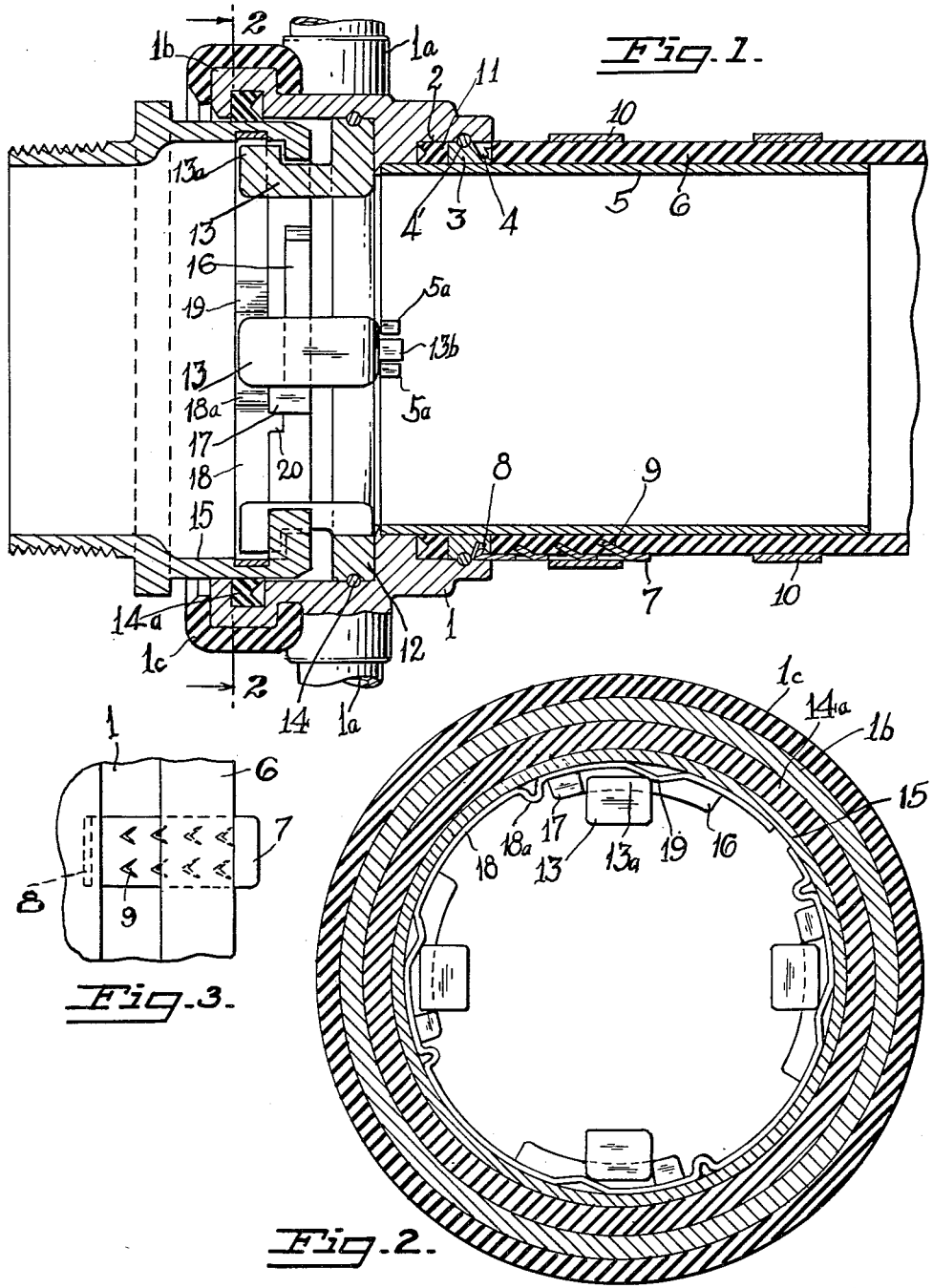

2,765,183

BAYONET TYPE CONDUIT COUPLING WITH SPRING DETENT

Frank D. Mahoney, Woodside, Calif.

Application October 26, 1953, Serial No. 388,161

1 Claim. (Cl. 285—87)

This invention relates to coupling means for tubular conduits.

The present invention provides improved coupling means for securely connecting two tubular conduits in end to end relationship. Unlike the common screw-union type of hose coupling which requires considerable time and effort to connect and disconnect, my improved conduit coupling embodies internally arranged sets of locking lugs and flanges carried on the adjacent ends of two coupling members, such sets of locking lugs and flanges being adapted to be brought into interlocking engagement with each other by merely turning one coupling member a small fraction of one revolution with respect to the other coupling member.

An object of my invention is to provide an improved hose or conduit coupling of the kind characterized, one which makes it possible to quickly connect and disconnect two tubular conduits.

Another object of my invention is to provide an improved conduit coupling having sets of interlocking lugs and flanges arranged internally on adjacent ends of two tubular coupling members, one of such coupling members also carrying spring means which is adapted to engage with the lugs of the other coupling member to normally prevent the disconnection of the conduits when liquid is flowing therethrough.

Other and further objects of my invention will be pointed out hereinafter, or will be indicated in the appended claim, or will be obvious to one skilled in the art upon an understanding of the present disclosure. For the purpose of this application, I have elected to show herein certain forms and details of coupling means for conduits which is representative of my invention; it is to be understood, however, that the embodiment of my invention herein shown and described is for purposes of illustration, and that therefore it is not to be regarded as exhaustive of the variations of the invention.

In the accompanying drawing:

Fig. 1 is a longitudinal sectional view taken through a coupling embodying the principles of my invention;

Fig. 2 is a sectional view taken on the line 2—2 of Fig. 1; and

Fig. 3 is a plan view of a fragmentary part of one of the conduits showing one of the securing clips used in connecting a rubber hose or conduit to a portion of the metal coupling.

Referring to the drawing the numeral 1 designates a tubular female fitting or coupling member having two or more outwardly projecting handles 1a secured thereto. Secured within an annular groove 2 arranged interiorly in the forward end portion of the tubular female coupling member 1 is a metal ring 3 having an annular inclined groove 4 formed therein. The female coupling member 1 and the metal ring 3 are securely connected one to the other by suitable means such as an encircling retaining wire 4' which is lodged in opposed circular grooves formed in the said coupling member and the ring. Suitably secured to the metal ring 3 is a tubular conduit 5 and connected thereon is a rubber hose 6. The hose is securely attached to the conduit 5 by means comprising a plurality of metal clips 7 which are each formed with a hooked end portion 8 that extends into the annular groove 4 of the ring 3. The body of each clip is provided with inwardly projecting sharp tongues 9 which project into the rubber hose 6. Several of the clips 7 are arranged circularly in spaced relation, and one of two metal hose clamps 10 firmly extending over the clips holds the latter in gripping engagement with the hose. A flexible sealing ring 11 is positioned in the annular groove 2 between the fitting 1 and the conduit 5 at the rear side of the ring 3.

Secured within the female coupling member 1 is a ring shaped lug carrier 12 which has a plurality of uniformly spaced inwardly and rearwardly protruding locking lugs 13 secured thereto. The female coupling member and the ring shaped lug carrier 12 are suitably secured together as by a retaining wire 14 which is lodged in opposed annular grooves formed in the said coupling member and the ring shaped lug carrier. The lugs 13 are somewhat L-shaped and each is formed with outwardly and radially extending rear end portions 13a. One of the lugs is formed with a forwardly extending projection 13b which is positioned between two inwardly extending spaced protuberances 5a formed on the conduit 5. The projection 13b and the lugs 5a provide means for preventing the independent rotary movement of the female coupling member 1 and lug carrier 12 with respect to the conduit 5 and the hose 6.

The female coupling member 1 is formed at its rear end with an annular boss 1b which has a ring shaped rubber covering 1c thereon, and mounted in an annular cavity within the boss is a flexible sealing ring 14a.

Fitting within the female coupling member 1 is a tubular male coupling member or conduit 15 having a threaded rear end portion to which a hose, pipe or other device may be connected. The forward end of the male coupling member 15 is formed with the same number of inwardly and radially protruding locking flanges 16 as there are locking lugs on the female coupling member, the said flanges being uniformly spaced one from another. The locking flanges 16 have inwardly disposed extensions or stop members 17 formed at corresponding ends thereof. The intervening spaces between the locking flanges 16 are sufficiently wide to permit the locking lugs 13 to pass through when the male coupling member 15 is inserted into the female coupling member 1. The stop members 17 are constructed and arranged to engage with the sides of the locking lugs 13 when the female coupling member is turned a fraction of one revolution in a counterclockwise direction (Fig. 2). When the female coupling member is turned in a counterclockwise direction after the male coupling member 15 has been inserted therein, the outwardly protruding rear end portions 13a of the locking lugs 13 will be carried behind the locking flanges 16 and into locking engagement therewith, thereby normally preventing the disconnection of the tubular members. However, since it is possible that the unexpected turning of the female coupling member 1 with respect to the male member 15, due to vibration or the twisting of the hose 6, may bring about a disconnection of these members while liquid is flowing therethrough, I have provided safety means for normally preventing the clockwise rotation of the female coupling member with respect to the male member. Seated in an annular groove formed in the inner surface of the male coupling member 15 is a yieldable circular spring 18 having the same number of uniformly spaced inwardly bent portions or protuberances 19 as there are lugs 13 on the female coupling member. The spring 18 is positioned rearwardly of the locking flanges 16 and in a position whereby the outwardly extending rear portions 13a of the locking lugs 13 may engage with the inwardly bent portions 19. The inwardly bent portions 19 of the yieldable spring 18 are so positioned with respect to the stop members 17 that when the locking lugs 13 have been carried to positions where their leading side edges engage with the stop members, the bent portions 19 will be in substantial engagement with the following side edges of the outwardly extending portions 13a of the said lugs. The locking lugs 13 will thus be normally held against movement in either a clockwise or counterclockwise direction by the stop members 17 and the inwardly bent portions 19 of the spring 18, and by reason of such confinement of the locking lugs, the female coupling member 1 will be prevented from rotating independently of the male coupling member 15. In connecting the male and female elements of the coupling, the outwardly extending portions 13a of the locking lugs ride over the inwardly bent portions 19 of the spring 18 when the female coupling member is turned in a counterclockwise direction. Similarly when the female coupling member is turned in the opposite direction to bring about the disconnection of the joined elements, the inwardly bent portions 19 of the spring are forced outwardly to allow the outwardly extending end portions 13a of the locking lugs to slide over them. The spring 18 is provided with two or more forwardly disposed flanges 20 (one of which is shown) which engage with certain of the stop members 17 to prevent the turning of the spring when the outwardly extending end portions 13a of the locking lugs are brought into pressing engagement with the inwardly bent portions 19. The spring 18 is bent inwardly as at 18a to allow the bent portions 19 to flex sufficiently when the lugs ride thereover. The flexible sealing ring 14a is arranged to engage with the outer side of the male member 15 to prevent leakage.

What I claim is:

In a conduit coupling, a female coupling member, a male coupling member slidably fitting inside the female coupling member, a plurality of spaced inwardly and radially protruding locking flanges secured to and positioned inside the male coupling member, a plurality of spaced locking lugs secured to and extending radially inside the female coupling member, the said locking lugs having outwardly and radially extending rear end portions arranged for positioning behind and in locking engagement with the locking flanges when the male and female coupling members are in assembled relationship, inwardly and radially protruding stop members arranged at corresponding ends of the locking flanges, the said stop members being constructed and arranged to engage with the locking lugs and limit the circular movement thereof in one direction when the coupling members are assembled, and yieldable spring means carried by the male coupling member and arranged to engage with the locking lugs to normally limit the circular movement of the said locking lugs when the latter are in locking relationship with the locking flanges, whereby the coupling members are normally maintained in connected relationship during the flow of liquid therethrough, the said locking lugs and the locking flanges being so constructed and arranged that when the male coupling member is inserted into the female coupling member in the assembly of the coupling members the said outwardly protruding end portions of the locking lugs will pass between the locking flanges.

References Cited in the file of this patent

UNITED STATES PATENTS

| 418,225 | Rice | Dec. 31, 1889 |
| 1,046,162 | Engelhard | Dec. 3, 1912 |
| 1,054,842 | Heimerman | Mar. 4, 1913 |
| 1,074,706 | Ferguson | Oct. 7, 1913 |
| 1,164,197 | Kildear | Dec. 14, 1915 |
| 1,622,216 | Anlauf | Mar. 22, 1927 |
| 1,697,037 | Witz | Jan. 1, 1929 |
| 1,838,313 | Kohr | Dec. 29, 1931 |
| 1,955,285 | Graham | Apr. 17, 1934 |

FOREIGN PATENTS

| 746,873 | France | Mar. 21, 1933 |